United States Patent
Wang

(10) Patent No.: US 10,114,907 B2
(45) Date of Patent: *Oct. 30, 2018

(54) QUERY PROCESSING FOR XML DATA USING BIG DATA TECHNOLOGY

(71) Applicant: International Business Machines Corporation, Armonk, NY (US)

(72) Inventor: George F. Wang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 14/940,239

(22) Filed: Nov. 13, 2015

(65) Prior Publication Data

US 2017/0140064 A1 May 18, 2017

(51) Int. Cl.
*G06F 17/30* (2006.01)
*H04L 29/08* (2006.01)

(52) U.S. Cl.
CPC .. *G06F 17/30938* (2013.01); *G06F 17/30076* (2013.01); *G06F 17/30194* (2013.01); *G06F 17/30864* (2013.01); *H04L 67/1097* (2013.01)

(58) Field of Classification Search
CPC ................................................. G06F 17/30932
See application file for complete search history.

(56) References Cited

U.S. PATENT DOCUMENTS

| | | | |
|---|---|---|---|
| 7,523,131 B2 * | 4/2009 | Warner | G06F 17/30917 |
| 7,620,889 B2 * | 11/2009 | Jones | G06F 17/2205 715/234 |
| 8,874,600 B2 | 10/2014 | Gupta et al. | |
| 2002/0107881 A1 * | 8/2002 | Patel | H03M 7/30 715/273 |
| 2003/0018646 A1 * | 1/2003 | Ohta | G06F 17/30908 |
| 2006/0031763 A1 * | 2/2006 | Yeung | G06F 17/3056 715/236 |
| 2006/0197967 A1 * | 9/2006 | Snover | G06F 9/45512 358/1.13 |
| 2014/0122412 A1 | 5/2014 | Bandekar et al. | |
| 2014/0129577 A1 * | 5/2014 | Young, Jr. | G06F 17/3089 707/758 |

(Continued)

OTHER PUBLICATIONS

A. Minutolo et al. "An Automatic Method for Deriving OWL Ontologies from XML Documents" IEEE P2P, Parallel, Grid, Cloud and Internet Computing (3PGCIC), 2014 Ninth International Conference on, 2014, pp. 426-431.

(Continued)

*Primary Examiner* — Kris E Mackes
(74) *Attorney, Agent, or Firm* — Cantor Colburn LLP; William A. Kinnaman, Jr.

(57) ABSTRACT

A computer-implemented method for offloading extensible markup language (XML) data to a distributed file system may include receiving a command to populate a distributed file system with an XML table of a database. The XML table may be queried in response to the command. The source data in the XML table may be offloaded, by a computer processor, to the distributed file system in response to the querying. The offloading may include converting the source data to a string version of the source data and converting the string version of the source data back into XML format.

14 Claims, 5 Drawing Sheets

(56) References Cited

U.S. PATENT DOCUMENTS

| | | |
|---|---|---|
| 2014/0280032 A1 | 9/2014 | Kornacker et al. |
| 2015/0032743 A1 | 1/2015 | Agrawal |
| 2015/0293711 A1* | 10/2015 | Yamamoto ............ G06F 3/0613 |
| | | 711/162 |
| 2016/0070694 A1* | 3/2016 | Drake ................ G06F 17/2705 |
| | | 715/234 |
| 2016/0085766 A1* | 3/2016 | Kushtagi ........... G06F 17/30073 |
| | | 707/689 |
| 2017/0139931 A1 | 5/2017 | Wang |

OTHER PUBLICATIONS

Disclosed Anonymously, "System and method for Information Deletion over Massive Scale data", IP.com IPCOM000220148D, Jul. 24, 2012, 6 pgs.

Disclosed Anonymously, "System and method to support specification of mapping of raw data (generated by multiple sources) to a normalized format and to perform the format conversion for the data such . . . ", IP.com IPCOM000234634D, Jan. 23, 2014, 7 pgs.

List of IBM Patents or Patent Applications Treated as Related; (Appendix P), Filed Mar. 8, 2018; 2 pages.

\* cited by examiner

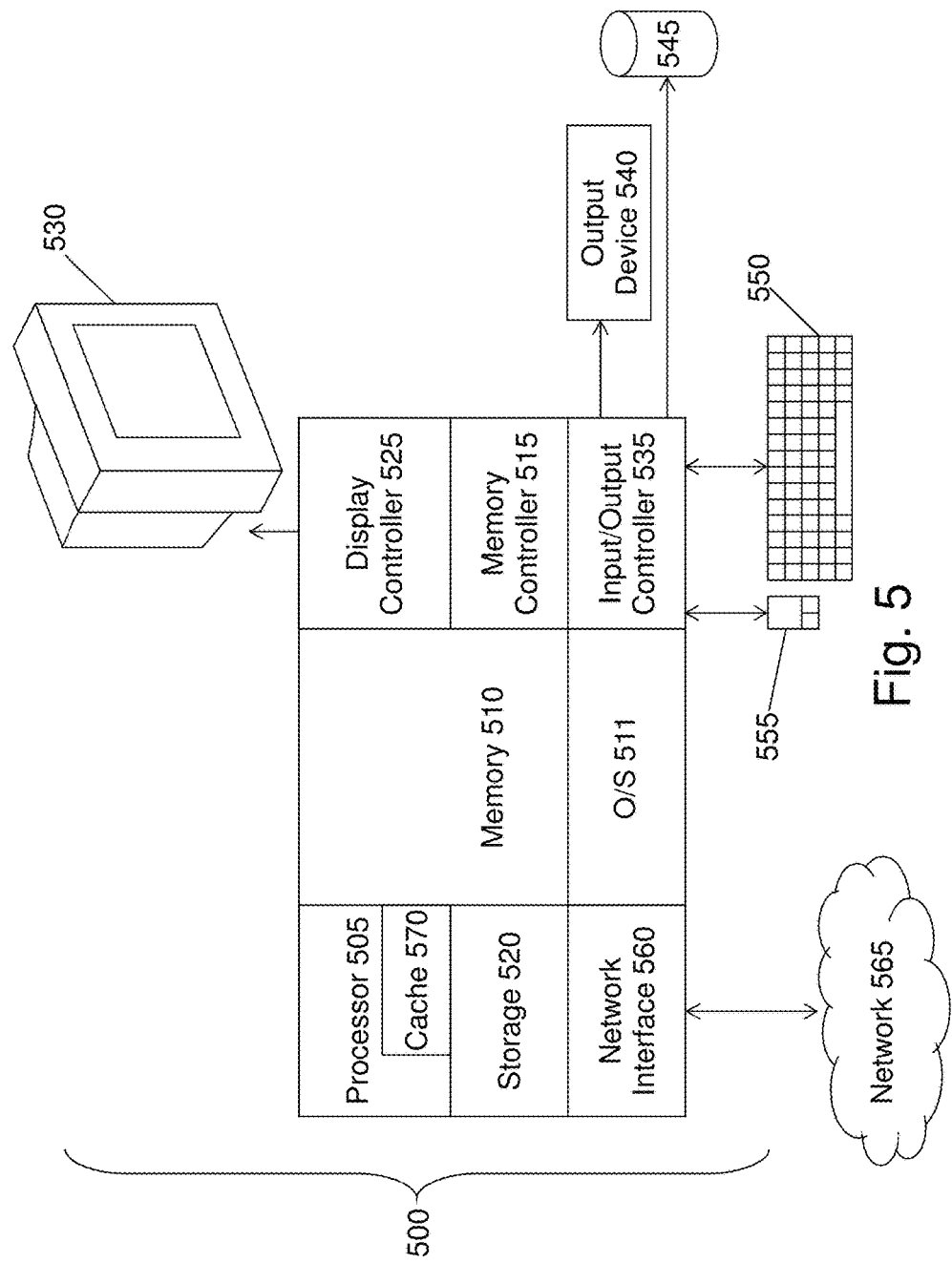

QUERY PROCESSING FOR XML DATA USING BIG DATA TECHNOLOGY

BACKGROUND

Some embodiments of the present invention relate to query processing for extensible markup language (XML) data and, more specifically, to query processing for XML data using big data technology.

XML is a popular markup language for semi-structured data. XML data can be manipulated using a query script language, such as XQuery or Jaql's XML path language (XPath). XPath is a query and functional programming language used to query and transform XML, text, and structured or non-structured data formats. XQuery scripting language allows an expression or predicate to be used to process XML data, and XQuery scripting is built on XPath expression.

DB2 is a family of relational database management system products from International Business Machines®. The use of XML tables within a DB2 database offers the ability to store data and documents without requiring a database schema. Users of DB2 can write query expressions in script to navigate through XML's hierarchical data structures and, in response, receive sequences of XML documents. As streaming real-time analytics become more pervasive, there will be more demand to process data in XML documents using query processing support.

As used herein, big data technology includes data processing systems that are designed to process complicated information in large sets of unstructured or semi-structured data. Conventional data processing applications and database management tools have difficulty analyzing big data because this analysis would require a large number of servers to analyze schema-free data content using massively paralleled processing applications. The architecture of big data is based on an open-source software framework called Apache Hadoop, which is used for distributed fast computation capability and data storage. Hadoop is a driver for handling thousands of nodes and petabytes of data in a short amount of time.

Hadoop Distributed File System (HDFS) provides high-throughput access to the big data stored within its internal nodes. Hadoop uses MapReduce framework to distribute processing of large data sets across those nodes.

SUMMARY

According to an embodiment of this disclosure, a computer-implemented method for offloading extensible markup language (XML) data to a distributed file system may include receiving a command to populate a distributed file system with an XML table of a database. The XML table may be queried in response to the command. The source data in the XML table may be offloaded, by a computer processor, to the distributed file system in response to the querying. The offloading may include converting the source data to a string version of the source data and converting the string version of the source data back into XML format.

In another embodiment, a system for offloading XML data to a distributed file system includes a memory having computer readable instructions and one or more processors for executing the computer readable instructions. The computer readable instructions may include receiving a command to populate a distributed file system with an XML table of a database. Further according to the computer readable instructions, the XML table may be queried in response to the command. The source data in the XML table may be offloaded to the distributed file system in response to the querying. The offloading may include converting the source data to a string version of the source data and converting the string version of the source data back into XML format.

In yet another embodiment, a computer program product for offloading XML data to a distributed file system includes a computer readable storage medium having program instructions embodied therewith. The program instructions are executable by a processor to cause the processor to perform a method. The method may include receiving a command to populate a distributed file system with an XML table of a database. Further according to the method, the XML table may be queried in response to the command. The source data in the XML table may be offloaded to the distributed file system in response to the querying. The offloading may include converting the source data to a string version of the source data and converting the string version of the source data back into XML format.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a block diagram of a computer system for implementing some or all aspects of the processing system, according to some embodiments of this disclosure.

DETAILED DESCRIPTION

Various embodiments of this disclosure provide an interface between a relational database management system (RDBMS) and big data and, more specifically, between DB2 and big data stored in Hadoop Distributed File Systems (HDFS). The interface may allow users to move operational data in extensible markup language (XML) from DB2 to HDFS. Some embodiments may further enable Online Analytical Processing (OLAP) applications in DB2 using XQuery technology.

A user may wish to use query scripting technology to query data that is formatted in XML. This introduces a number of challenging issues. First, for instance, no existing technology is available to analyze XML data on HDFS. Such a query would require large-scale data offloading from a DB2 XML table to HDFS, which presents performance issues. Further, there is no existing backend support by a DB2 application for importing data back from HDFS to DB2 in XML format. In summary, the lack of existing XML data analytic technology restricts DB2 clients from using online analytical processing (OLAP) applications.

According to this disclosure, some embodiments of a processing system enable DB2 users to run query expressions using big data technology with HDFS. To that end, the processing system may offload XML data from a DB2 server to HDFS, thus delivering a web-console-based application for fast query processing using the MapReduce framework of Hadoop. Authorized DB2 users may thus retrieve a query result using big data technology by running a DB2 application against the DB2 server.

The processing system may implement OLAP query processing on XML data in the MapReduce framework, through the use of file type conversion. In other words, the system may enable HDFS to receive XML data from a DB2 database via a BigInsights ad-hoc server. XML documents may be distributed in HDFS, and the MapReduce framework may be used to analyze the distributed data against a query in the form of a Jaql's XML path language (XPath) query script. An ad-hoc analytical processing application may send analytical results from the BigInsights™ server to a DB2 database at the DB2 server, where the results may be in plain text or transformed into an XML document. Thus, DB2 clients may also perform high-volume online transaction processing (OLTP).

Figure 1:
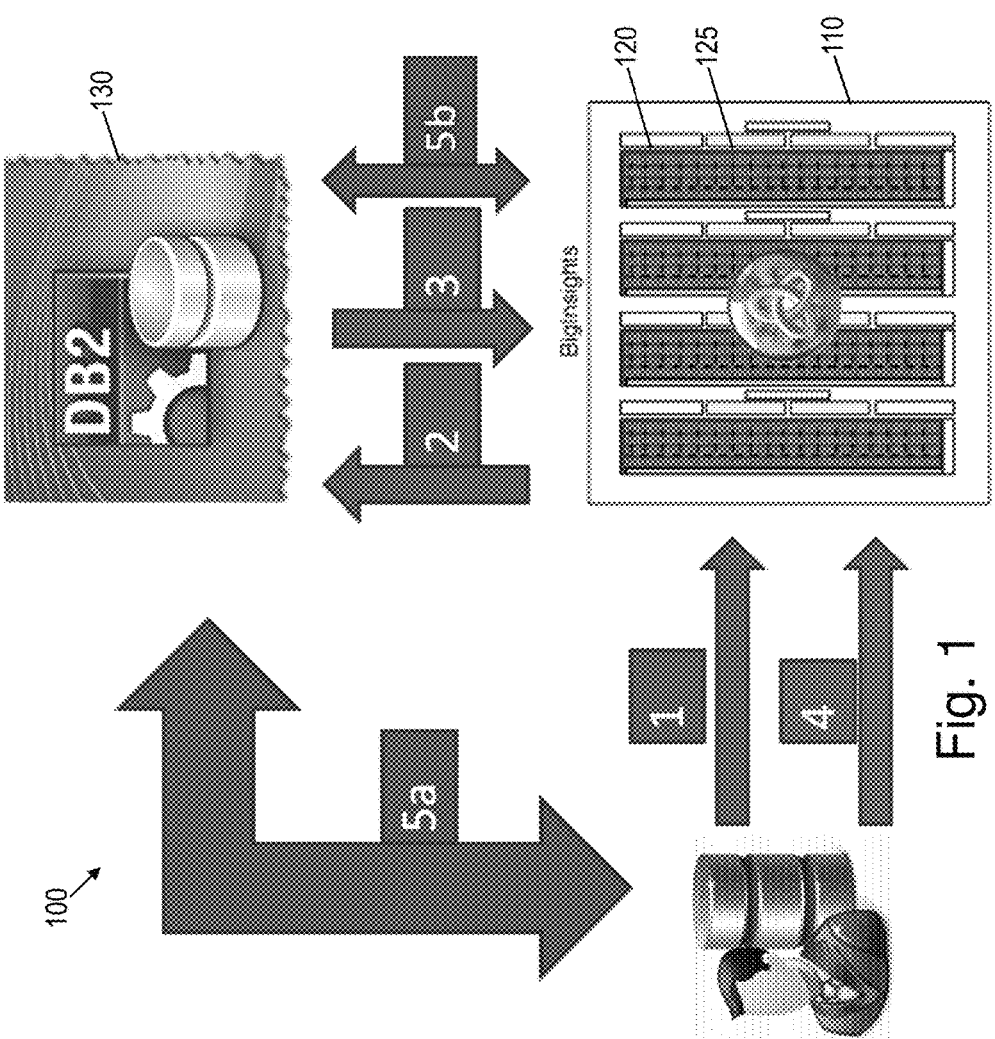
FIG. 1 is a block diagram of a processing system, according to some embodiments of this disclosure.

FIG. 1 is a block diagram of a processing system 100, according to some embodiments of this disclosure. As shown, the processing system 100 may include an analytics tool 110, such as International Business Machine's BigInsights. The analytics tool 110 may run on a software framework 120, such as Hadoop, supporting distributed processing of large data sets. In some embodiments, the software framework 120 may incorporate a distributed file system 125, such as Hadoop Distributed File System (HDFS), and a processing tool configured for large data, such as MapReduce functionality. The processing system 100 may further include a database 130 of an RDBMS, such as DB2.

Although references to Hadoop, HDFS, and MapReduce are made throughout this disclosure, it will be understood that another software framework 120 capable of supporting distributed processing of large data sets may be substituted for Hadoop, another distributed file system 125 may be substituted for HDFS, and another processing tool for distributed data may be substituted for MapReduce. Further, although repeated references are made to BigInsights, it will be understood that another analytics tool 110 may be substituted for BigInsights. Although repeated references are made to DB2, it will further be understood that some other RDBMS may be used. However, some embodiments of this disclosure may park particularly well when implemented with Hadoop, HDFS, MapReduce, BigInsights, and DB2.

The processing system 100 may provide a connection between the database 130 and big data stored in the distributed file system 125. To this end, the processing system 100 may process XML queries in the distributed file system 125, and may enable storage of the results in both the distributed file system 125 and the database 130. Storage in the distributed file system 125 may be useful for OLAP, while storage in the database 130 may be useful for online transaction processing (OLTP).

Figure 2:
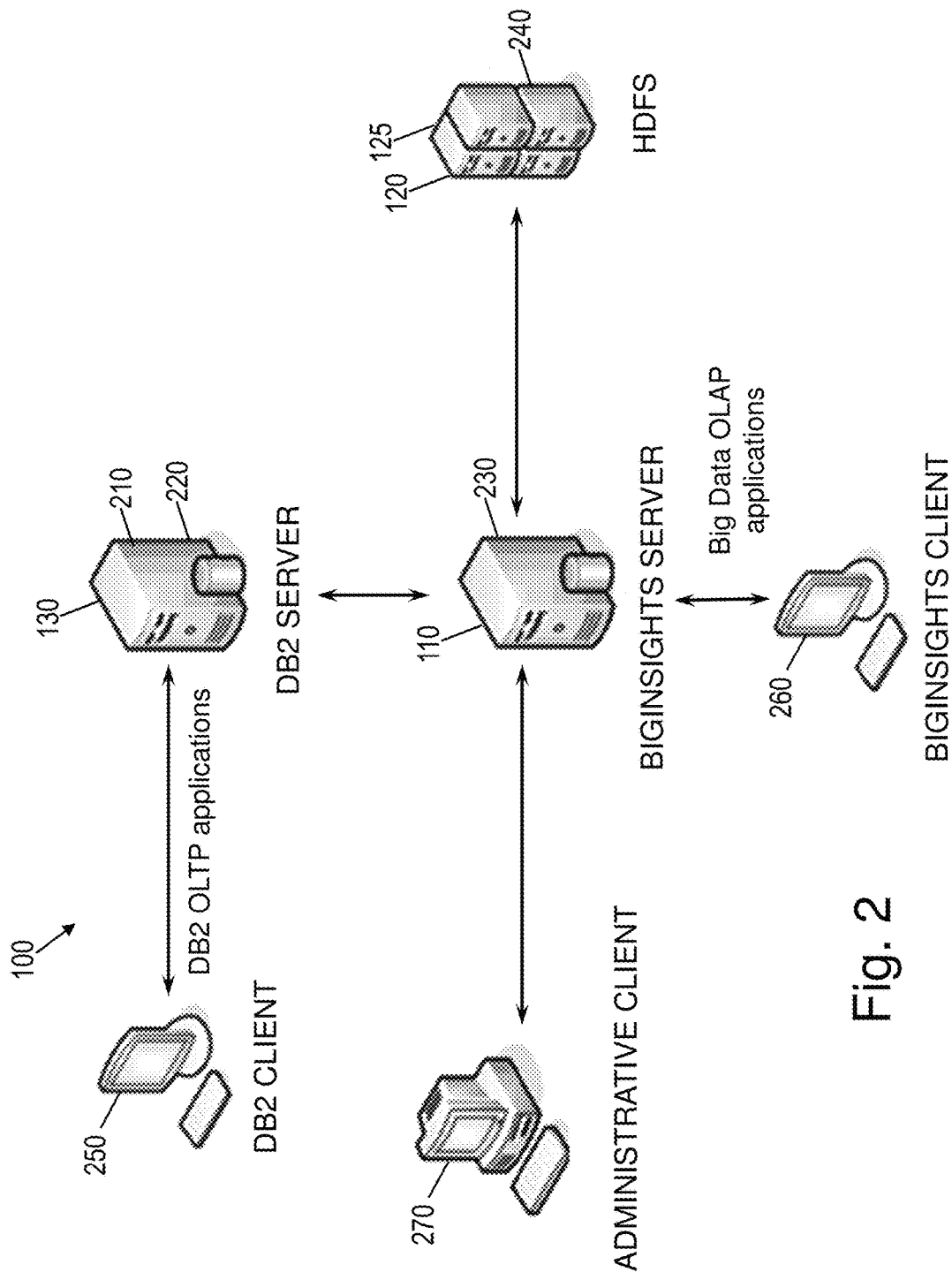
FIG. 2 is another block diagram of the processing system, according to some embodiments of this disclosure.

FIG. 2 is another block diagram of the processing system 100, according to some embodiments of this disclosure. As shown, in some embodiments according to this figure, the database 130 is a DB2 database 210 on a DB2 server 220, the analytics tool 110 is BigInsights at a BigInsights server 230, and the distributed file system 125 is HDFS 240.

In some embodiments, the DB2 server 220 behaves as a data warehouse, with XML tables being initially stored there, but without big data processing tools. A DB2 client 250 may process OLTP applications on the DB2 server 220. The BigInsights server 230 may provide a web console to allow a user, such as a business administrator, at a BigInsights client 260 to process OLAP applications. Further, a process administrator at an administrative client 270 may handle query loading management as well as data loading management for data interchange and query processing control. In some embodiments, the BigInsights client 260, and the administrative client 270 may operate independently of one another, as independent entities, as shown in FIG. 2.

Referring back to FIG. 1, by way of a query, such as a structured query language (SQL) query, a user of the database 130 can issue a command, such as on a web console of the analytics tool 110, which may be a web console of the BigInsights server 230. In response to the command, the analytics tool 110 may perform a database import process to dynamically offload source data from the database 130. This offloading may be performed by various mechanisms.

In some embodiments, the bulk of the offloading work may be performed by the database 130. Where the database 130 is the DB2 database 210, the distributed file system 125 is HDFS 240, and the analytics tool 110 is BigInsights, as in FIG. 2, the offloading may use a Java database connectivity (JDBC) connection driver to form a DB2 connection from HDFS 240 to the BigInsights server 230. JDBC is an application programming interface for the Java programming language, defining how to access a database 130. Helper functions of JDBC may support JDBC type-2 connectivity for job submissions to BigInsights. A DB2 add-on support function may provide sample DB2 user-defined functions (UDFs) that allow DB2 developers to launch XML query expressions over BigInsights. In some embodiments, DB2 users may be enabled to use this UDF functionality to submit data via DB2 applications onto HDFS 240 using a JDBC type-2 connector.

In some embodiments, the bulk of the offloading work may be performed by the analytics tool 110. Again, where the database 130 is a DB2 database 210, the distributed file system 125 is HDFS 240, and the analytics tool is BigInsights, as in FIG. 2, the offloading may be performed from a BigInsights web console after Database Import, an ad-hoc application, is deployed. In some embodiments, the Database Import application requires a DB2 JDBC connector JAR with a list of parameters, including the source data and destination, to store the data on HDFS 240. This approach need not utilize any UDFs to offload the data.

This offloading performed in the database import process may select at least one table in the database 130 and may process the query on that table to extract one or more XML documents from the table in response to the query. The resulting source data of this extraction may be a collection of plain text data, e.g., in comma-separated values (CSV) format, transformed from the XML documents in the table. This source data may be used to populate, and may thus be stored in, the distributed file system 125.

In embodiments similar to FIG. 2, when the XML version of the source data is offloaded onto HDFS 240, the source data may be converted from XML to at least one string stored as a plain text version of the source data. More specifically, during offloading from DB2 to HDFS 240, the source data stored in XML format in a DB2 database on the DB2 server 220 may be converted to plain text in string format on HDFS 240. This plain text, however, may still include the XML tags from the original data. The plain text may later be reparsed to restructure it into XML for XPath query processing. This conversion to plain text and then later back into XML may be due to XPath being a query language that supports XML parsing only. Thus, to allow XPath to run against the offloaded source data, the processing system 100 may therefore convert the plain text version of the source data back into XML or XML-like data for querying.

An XML processing application may be deployed to the BigInsights server 230 from the BigInsights web console. This XML processing application may transform the plain text file having XML tags into XML format. To this end, the XML processing application may read each byte between the first start tag and the stop tag of each plain text file. In some embodiments, the tags may be UTF-8 bytes, and the XML processing application may treat them as such during this reading. In some embodiments, each pair of a start tag and a stop tag within an XML file may indicate the beginning and the end, respectively, of a session or related group of XML data. Throughout this disclosure, the XML data between a start tag and its associated stop tag is referred to as a record. Thus, to transform the plain text back to a structured XML format that an XPath function can parse to process an XPath query, the XML tags may be removed because those tags are not returned as part of the result data for an XPath query, according to some embodiments. In some embodiments, while converting the plain text back into XML data, if a start tag in the plain text is null, or cannot be found, then a record may be assumed to be empty. If the last record within a plain text file is not terminated with a stop tag, the parse processing may assume a stop tag exists and behave as if this is the case.

In some embodiments, configuration for processing the plain text, as described above, may use the following functions supported by the com.ibm.jaql.io.hadoop library:
"com.ibm.jaql.io.hadoop.TagTextInputFormat.tag.start"
"com.ibm.jaql.io.hadoop.TagTextInputFormat.tag.stop"
"com.ibm.jaql.io.hadoop.TagTextInputFormat.tag.remove"
"com.ibm.jaql.io.hadoop.TagTextInputFormat.max.record.size"

To transform a plain text file into an XML format that Jaql can interpret, a function may be used to interpret each XML tag. An example of such a function is the below tagText function, provided below in Jaql language. To identify the attribute of a tag, the function may take as input a location of the input file that is the plain text version of the source data stored on HDFS 240, start and stop positions, which may be positions of strings delineating respectively the start and end of the tag, and a maximum size of a record.

```
tagText = fn(
    location: string,
    start: string?,
    stop: string,
    removeTags: boolean = false,
    maxRecordSize: long = 1000000 )
{
    location,
``` inoptions:

```
{ adapter: "com.ibm.jaql.io.hadoop.DefaultHadoopInputAdapter",
  format: "com.ibm.jaql.io.hadoop.TagTextInputFormat",
  configurator: "com.ibm.jaql.io.hadoop.FileInputConfigurator",
  converter: "com.ibm.jaql.io.hadoop.FromLinesConverter",
  conf:
    { "com.ibm.jaql.io.hadoop.TagTextInputFormat.tag.start": start,
      "com.ibm.jaql.io.hadoop.TagTextInputFormat.tag.stop": stop,
      "com.ibm.jaql.io.hadoop.TagTextInputFormat.tag.remove":
      removeTags,
      "com.ibm.jaql.io.hadoop.TagTextInputFormat.max.record.size":
maxRecordSize,
    }
}
};
```

The definition of the location variable in the above may inherit the Hadoop I/O library, which may require helper functions to define the plain text format being transformed. Thus, inoptions may specify a number of parameters to support parsing a tag's text.

Some embodiments may also use a function to define the format of XML. This function, referred to below as xmlText, may take as input a location of an XML file that represents the converted source data stored on HDFS 240, a node tag, a maximum record size, and a pseudo-structure of a tag. This function may parse a repeated xml element from either a single XML document or a concatenation of documents. In some embodiments, as with the below example implementation of the function, this function does not support nested loops and does not accept the existence of "<tag>" inside any CDATA sections.

```
xmlText = fn(
    location: string,
    tag: string,
    removeTags: boolean = false,
    maxRecordSize: long = 1000000 )
    tagText( location, strcat('<',tag,'>'), strcat('</',tag,'>'), removeTags,
maxRecordSize );
```

In some embodiments, each XML file may be validated after being formed. This may be particularly helpful as a pre-processing tool to ensure there is no broken data for high-volume analytic transactions. One implementation of a function for validating an XML file appears below, referred to as nestedTags. Validating various XML files may involve repeated calls to xmlText, or a similar function, to process each set of records. This function may determine whether there are any nested tags within an XML file that has been transformed from plain text. However, if this function reports any such tags, then the above xmlText function will not operate properly. When a nested tag is identified, the function may eliminate the tag value of the nested tag by removing the "<" and ">" delineating the tag, and may then use a lambda function to store the tag value in the $startTag variable. As a result, an expanded value in the subsequent record may be correlated with this tag value as a pair association.

```
nestedTags = fn(location: string, tag: string, maxRecordSize: long =
1000000, limit: long = 100)
(
    startTag = strcat('<',tag,'>'),
    read(xmlText(location, tag, removeTags=true, maxRecordSize =
maxRecordSize))
    -> filter strPos($,startTag) >= 0
    -> group expand pickN($, limit)
);
```

After the plain text version of the source data is converted to XML, the converted source data may be readable as XML data for use of XPath querying process.

Figure 3:
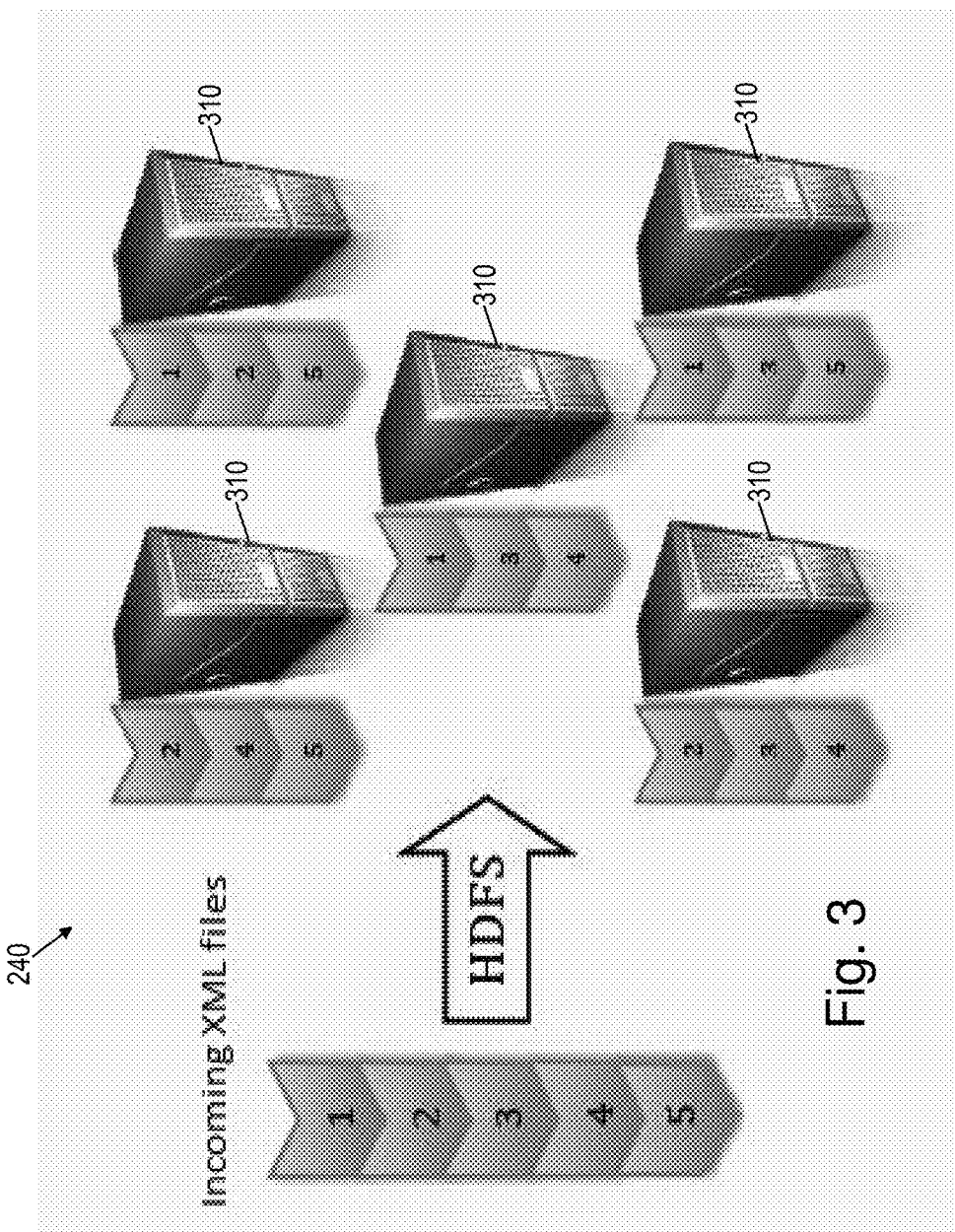
FIG. 3 is a block diagram of loading incoming source data into a distributed file system, upon offloading that source data from a database, according to some embodiments of this disclosure.

FIG. 3 is a block diagram of loading incoming source data into the distributed file system 125, upon offloading that source data from the database 130, according to some embodiments of this disclosure. Specifically, the source data being loaded may be the XML data that was converted from plain text. In some embodiments, before the source data can be processed for responding to Xpath queries, upon being offloaded from the database 130, the source data may be distributed across the distributed file system 125.

Source data being received from the database 130 may be distributed across the distributed file system 125. As shown, the distributed file system 125 may include two or more nodes 310, each of which may be a computing device configured to store data as part of the distributed file system 125. The source data may be divided into source files, which may be XML files given that the source data may be XML data. The source files may be copied to the nodes 310, with each source file being copied to at least one node 310. In some embodiments, there may be some redundancy, such that a source file is copied to more than a single node 310. More specifically, in some embodiments, the Zookeeper maintenance tool may create two duplicates of each source file for copying among the various nodes 310. For example, FIG. 3 illustrates six source files, labeled 1 through 6, each duplicated twice and being copied across five nodes 310. This redundancy may be useful for disaster recovery, such as when one or more nodes 310 go down.

With the distributed file system 125 already having been populated with the source data resulting from the original query, the user can query the XML files that are now stored in the distributed file system 125. In some embodiments, this querying may be performed by running XPath function on the distributed file system 125. Herein, this new query is referred to as the XPath query, although it will be understood that another query language for XML files may be used in some embodiments. When the XPath query is received at the software framework 120, a MapReduce job may be initiated to spawn a Mapper that filters relevant information from each XML file across the nodes 310. The relevant information from the various nodes 310 may then be aggregated. The result of this XPath query may be stored in the distributed file system 125.

More specifically, in some embodiments similar to FIG. 2, the result data of the XPath query may be stored into org.json.JSONArray format. To enable writing the result data into a recognizable data format, the org.json.JSONArray format may be serialized to a string, which may be transformed into a single-element array with the value of the string being the single element. In this single-element array form, the result data may be written to HDFS 240 inline. In some embodiments, the string may be as large as 1 GB and may be stored on a single node 310 of HDFS 240.

In some embodiments, the user may be enabled to run a UDF with an application of the database 130 to retrieve the results of the XPath query from the distributed file system 125 and to store this result in the database 130. Thus, the result data of the XPath query may be stored in the distributed file system 125.

In some embodiments, the distributed file system 125 supports XQMapper functions, which may enable the MapReduce Mapper to process query expressions for XML representation. One of such functions may enable the Mapper to process XML data. To this end, that function may extract key-value pairs. Thus, the XPath query may return result data generated by the MapReduce Reducer after the Mapper job is auto-distributed across the distributed file system 125. In some embodiments, this result data may be in JSON String representation.

In some embodiments, at least for the purpose of synchronization, the result data may also be transferred directly from the distributed file system 125 to the database 130. For instance, in embodiments similar to FIG. 2, this may be performed by way of DB2's HDFS_Read function. The HDFS_READ command may be called to retrieve the result data. This command may transform the result data back into XML data, such as by using the XMLPARSE built-in function, or the command may simply store the result data in VARCHAR representation, which is a varying-length character string in length between 1 and 32704. An XML table in the database 130 may be populated using generic UDF table transformation support, such that the result data on the distributed file system 125 can be converted to XML when the result data is read back to the database 130.

Figure 4:
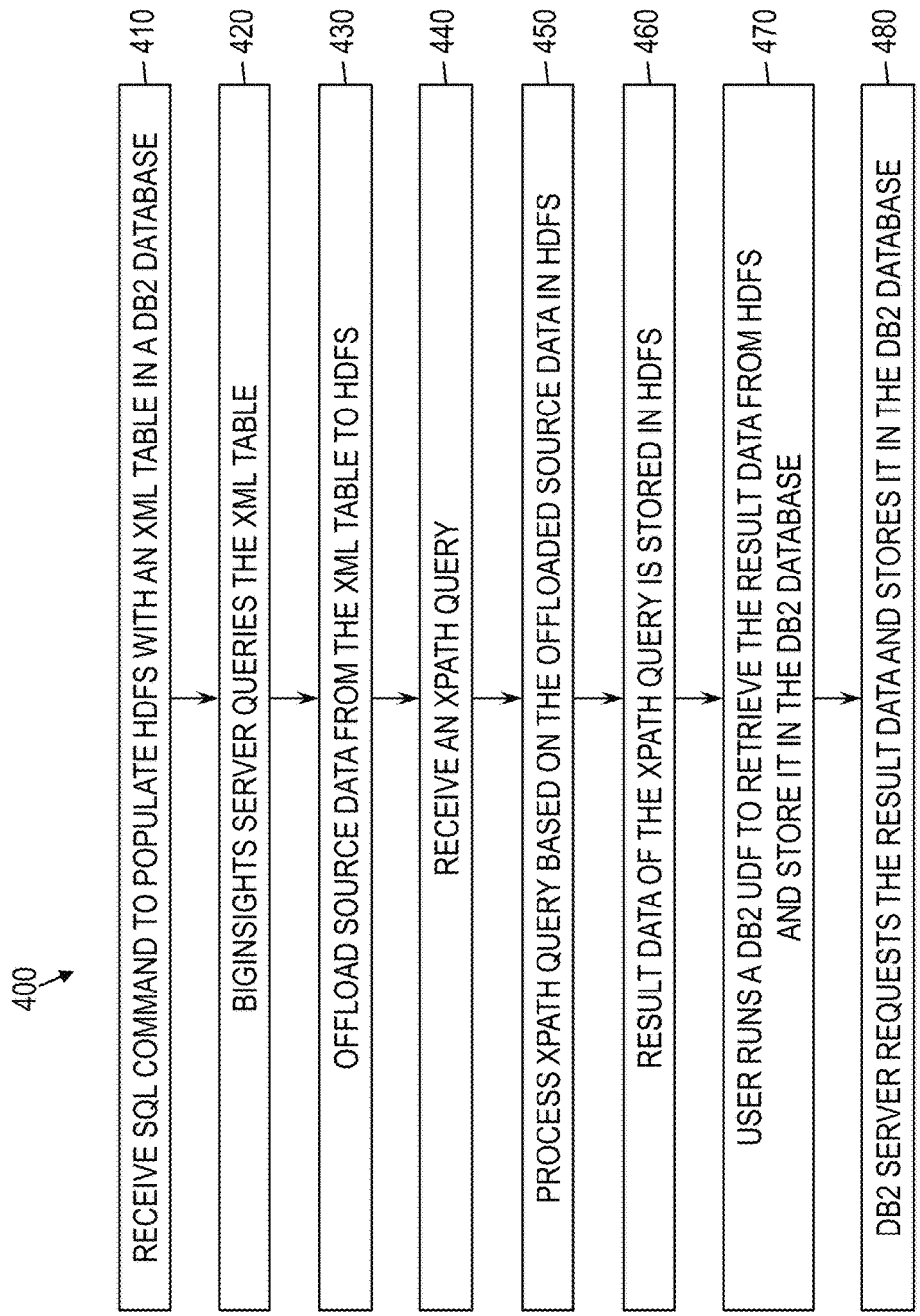
FIG. 4 is a flow diagram of a method for offloading extensible markup language (XML) data to Hadoop Distributed File System (HDFS) and processing a query on the offloaded data, according to some embodiments of this disclosure.

In accordance with the above, FIG. 4 is a flow diagram of a method for offloading XML data to HDFS 240 and processing a query on the offloaded data, according to some embodiments of this disclosure. As shown, at block 410, an SQL command may be received from a user to populate HDFS 240 with at least one XML table in a DB2 database 210 at a DB2 server 220. At block 420, in response to the command, the BigInsights server 230 may query the XML table on the DB2 database 210. At block 430, in response to the query from the BigInsights server 230, source data in the XML table may be offloaded to HDFS 240. That source data may be XML data. At block 440, an XPath query may be received from a user. At block 450, the XPath query may be processed based on the offloaded source data now stored in HDFS 240, which may generate result data. At block 460, the result data of the XPath query may be stored on HDFS 240. At block 470, a user may run a DB2 UDF to retrieve the result data of the XPath query from HDFS 240 and to store them on the DB2 database 210. At block 480, the DB2 server may request the result data of the XPath query and store the result data in the DB2 database 210.

FIG. 5 illustrates a block diagram of a computer system 500 for use in implementing a processing system 100 or method 400 according to some embodiments. The processing systems 100 and methods 400 described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For instance, each of the DB2 server 220, the DB2 client 250, the BigInsights server 230, the BigInsights client 260, the administrative client 270, and the HDFS nodes 310 may be computer systems 500.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the processing systems 100 and methods 400 of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Processing systems 100 and methods 400 according to this disclosure may be embodied, in whole or in part, in computer program products or in computer systems 500, such as that illustrated in FIG. 5.

Technical effects and benefits of some embodiments include an offloading process to transfer data from an XML table in a DB2 database to HDFS, and the ability to query that transferred data using XPath. As a result, DB2 user may be enabled to run query expressions using big data technology.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for offloading extensible markup language (XML) data to a distributed file system, comprising:
   a memory having computer readable instructions; and
   one or more processors for executing the computer readable instructions, the computer readable instructions comprising:
      receiving a command to populate a distributed file system with an XML table of a database;
      querying the XML table in response to the command;
      offloading source data in the XML table to the distributed file system in response to the querying;
      receiving an XML path language (XPath) query against the XML table in the database;
      processing the X query based on the source data in the distributed file system to generate a result data; and storing the result data on the distributed file system in response to the XPath query.

2. The system of claim 1, wherein the database is a DB2 database and the distributed file system is Hadoop Distributed File System (HDFS), and wherein the processing the XPath query based on the source data in the distributed file system to generate the result data comprises use of MapReduce functionality.

3. The system of claim 2, the computer readable instructions further comprising:
receiving a DB2 user-defined function to retrieve the result data; and
storing the result data to the DB2 database in response to the DB2 user-defined function.

4. The system of claim 2, the computer readable instructions further comprising:
receiving a request for the result data from the DB2 database; and
storing the result data to the DB2 database responsive to the request.

5. The system of claim 2, wherein the offloading is performed by a BigInsights server.

6. The system of claim 2, wherein the offloading is performed by a server for the DB2 database.

7. A computer program product for offloading extensible markup language (XML) data to a distributed file system, the computer program product comprising a computer readable storage medium having program instructions embodied therewith, the program instructions executable by a processor to cause the processor to perform a method comprising:
receiving a command to populate a distributed file system with an XML table of a database;
querying the XML table in response to the command;
offloading source data in the XML table to the distributed file system in response to the querying;
receiving an XML, path language (XPath) query against the XML, table in the database;
processing the XPath query based on the source data in the distributed file system to generate a result data; and
storing the result data on the distributed file system in response to the XPath query.

8. The computer program product of claim 7, wherein the database is a DB2 database and the distributed file system is Hadoop Distributed File System (HDFS), and wherein the processing the XPath query based on the source data in the distributed file system to generate the result data comprises use of MapReduce functionality.

9. The computer program product of claim 8, the method further comprising:
receiving a DB2 user-defined function to retrieve the result data; and
storing the result data to the DB2 database in response to the DB2 user-defined function.

10. The computer program product of claim 8, the method further comprising:
receiving a request for the result data from the DB2 database; and
storing the result data to the DB2 database responsive to the request.

11. The computer program product of claim 8, wherein the offloading is performed by a BigInsights server.

12. The system of claim 1, wherein the offloading comprises converting the source data to a plain text version of the source data and converting the plain text version of the source data back into XML format.

13. The computer program product of claim 7, wherein the offloading comprises converting the source data to a plain text version of the source data and converting the plain text version of the source data back into XML format.

14. The computer program product of claim 8, wherein the offloading is performed by a server for the DB2 database.

* * * * *